Feb. 24, 1948.　　　L. M. OBERMAN　　　2,436,524
CANNING RACK
Filed June 3, 1946
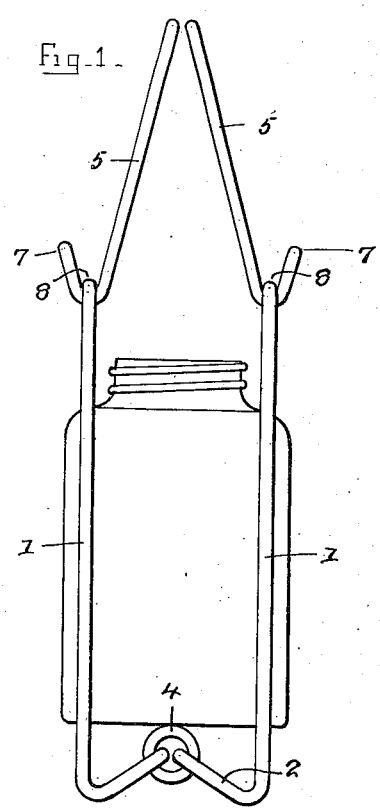
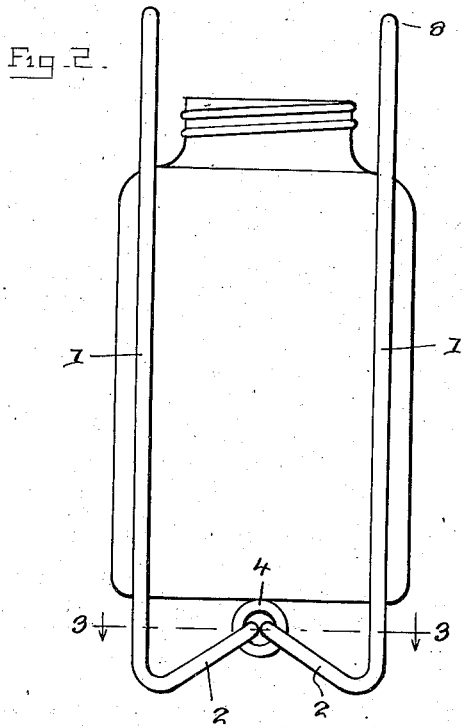
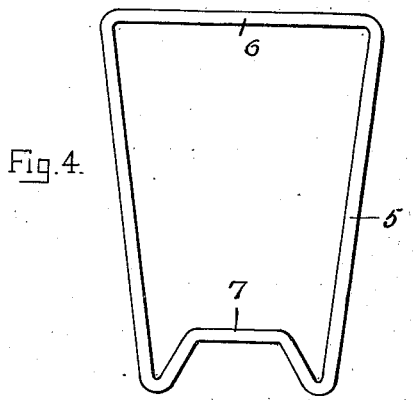
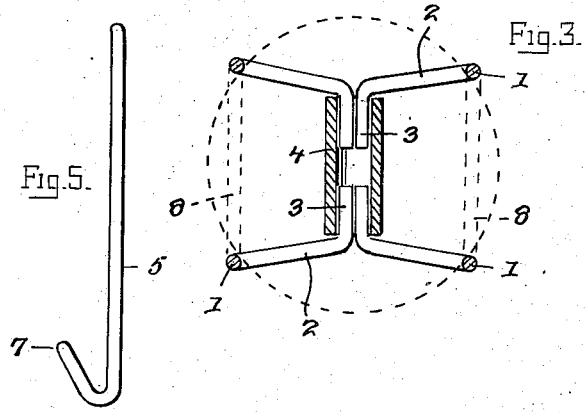
INVENTOR.
Lucile M. Oberman
BY *Victor J. Evans & Co.*
ATTORNEYS Patented Feb. 24, 1948

2,436,524

UNITED STATES PATENT OFFICE 2,436,524

CANNING RACK

Lucile M. Oberman, Escondido, Calif.

Application June 3, 1946, Serial No. 673,977

1 Claim. (Cl. 224—48)

This invention relates to improvements in devices used in the canning of fruits, vegetables, and the like, and more particularly to the provision of a rack to facilitate the handling of jars, etc., especially in hot water.

In the canning of fruits, vegetables, and the like it is necessary to lower the jars containing the products into very hot water, and there is always the danger of scalding the hands. Also, heretofore the bottom of the jars rested generally immediately on the bottom of the pot containing the hot water, and circulation of water about the bottom of the jar was somewhat arrested.

It is, therefore, an object of this invention to provide a collapsible rack by means of which a jar can be conveniently lowered into a container of very hot water without danger of scalding.

A further object is the provision of a rack for canning purposes which is so constructed as to maintain the bottom of a jar above the bottom of the container of hot water.

A further object is the provision of a canning rack having few parts the rack being collapsible and simple in structure, enabling it to be manufactured at a very low cost.

These and other objects are attained by the novel construction and arrangement of parts hereinafter described and illustrated by the accompanying drawings, forming a part hereof, and in which:

Fig. 1 is an elevational view of a rack embodying the invention, the rack being shown with handles and supporting a jar.

Fig. 2 is an elevational view of the rack without handles as it would appear in a container of hot water.

Fig. 3 is a sectional view taken on the line 3—3 of Fig. 2.

Fig. 4 is a front view of a handle used with the rack.

Fig. 5 is a side view of the handle.

Referring to the drawings, Figs. 1 and 2, the rack is shown to comprise substantially rectangular wire members having vertical legs 1, which have inwardly and upwardly directed portions 2 as shown in Fig. 2. The portions 2 are also bent at an angle towards each other as shown in Fig. 3. The portions 2 of the wire members have ends bent inwardly towards each other, and positioned in a short tube 4.

To facilitate the lowering of the rack into a container handles are provided as shown in Figs. 4 and 5. The handle has a hand receiving cross bar 6 connected to legs 5, the lower ends of which are bent upwardly and inwardly providing a lower cross bar 7 which is adapted to engage the cross-bar 8 connecting the legs 1.

As will be seen, by removing the tube 4, the rack can be readily collapsed if so desired. The handles are obviously detachable as they merely slip under the cross-bars 8.

As above described, the portions 2 are bent upwardly and inwardly and at an angle. The tube 4 serves to form a hinge joint, and the weight of the jar bearing on the tube 4 tends to spread the portions 2 causing the legs 1 to firmly grip the jar. This arrangement also supports the jar in a manner to prevent it from contacting the bottom of the container of hot water, thus providing a space to allow the water to circulate about the bottom of the jar as well as around the sides.

The canning rack is clearly simple in structure, being formed of wire, preferably, which will not corrode. The rack can be made in various sizes, and when not in use, it can be disassembled so as to occupy little space in storage. The side members of the rack and handles being of identical shape, there is no confusion in assembling. The cost of manufacture is small, and a canner can own a considerable number of the racks at little expense, the racks being usable year after year.

The above description is to be considered as illustrative and not limitative of the invention, of which modifications can be made without departing from the spirit and scope of the appended claim.

The invention having been described, what is claimed is:

A canning rack, comprising a pair of U-shaped side members having legs with their lower ends bent upwardly and inwardly, the ends of the legs being also bent towards each other, a tube receiving the bent ends of the legs and acting as a hinge, and handles having portions to detachably engage the side members.

LUCILE M. OBERMAN.

REFERENCES CITED

The following references are of record in the file of this patent:

UNITED STATES PATENTS

| Number | Name | Date |
|--------|------|------|
| 353,147 | Lederle | Nov. 23, 1886 |
| 1,103,615 | Nilson | July 14, 1914 |
| 1,337,010 | Frey | Apr. 13, 1920 |

FOREIGN PATENTS

| Number | Country | Date |
|--------|---------|------|
| 245,230 | Great Britain | Jan. 7, 1926 |
| 63,992 | Switzerland | Feb. 19, 1913 |